United States Patent

[11] 3,582,926

| | | | |
|---|---|---|---|
| [72] | Inventor | Mohammed A. Hassan Glendale, Calif. | |
| [21] | Appl. No. | 719,491 | |
| [22] | Filed | Apr. 8, 1968 | |
| [45] | Patented | June 1, 1971 | |
| [73] | Assignee | Crane Co Chicago, Ill. | |

[54] TEMPERATURE INDICATOR FOR AIRCRAFT BRAKES AND THE LIKE
21 Claims, 2 Drawing Figs.

[52] U.S. Cl. .................................................. 340/214,
340/227, 340/228, 340/412, 340/52, 340/57
[51] Int. Cl. .................................................. G08b
29/00, G08b 17/00
[50] Field of Search............................................ 340/52, 57,
58, 227, 228, 213, 412

[56] References Cited
UNITED STATES PATENTS

| | | | |
|---|---|---|---|
| 1,542,096 | 6/1925 | Riblet............................ | 340/57 |
| 2,523,594 | 9/1950 | Sagaser et al................. | 340/58X |
| 2,894,246 | 7/1959 | Graffendried................ | 340/58X |
| 2,925,559 | 2/1960 | De Sautels.................... | 340/228UX |
| 2,992,120 | 7/1961 | Elsken.......................... | 340/228 |
| 3,249,916 | 5/1966 | Quinn........................... | 340/58 |
| 3,283,579 | 11/1966 | Josephs........................ | 340/228X |
| 3,347,098 | 10/1967 | Bielstein et al. ............. | 340/227X |
| 3,454,925 | 7/1969 | Ruof............................. | 340/227X |
| 3,468,264 | 9/1969 | Sutherland................... | 340/228X |

Primary Examiner—John W. Caldwell
Assistant Examiner—Perry Palan
Attorney—Sellers and Brace ABSTRACT: A temperature indicating and warning system utilizing thermocouple heat sensors connected through cabling to individual amplifying and readout facilities at a remote location and equipped with means for compensating for changes in the ambient temperature at the cold junction reference for the several heat sensors. In a typical application the heat sensors are used to sense temperature conditions at each braked wheel of aircraft landing gear and connected to readout facilities in the pilot's compartment. These facilities include means providing distinctive signals when the temperature at any braked wheel exceeds different selected levels and includes simple manually operated means enabling a crew member to determine which one or ones of the wheels are affected. The system also includes means for checking it for operativeness prior to use.

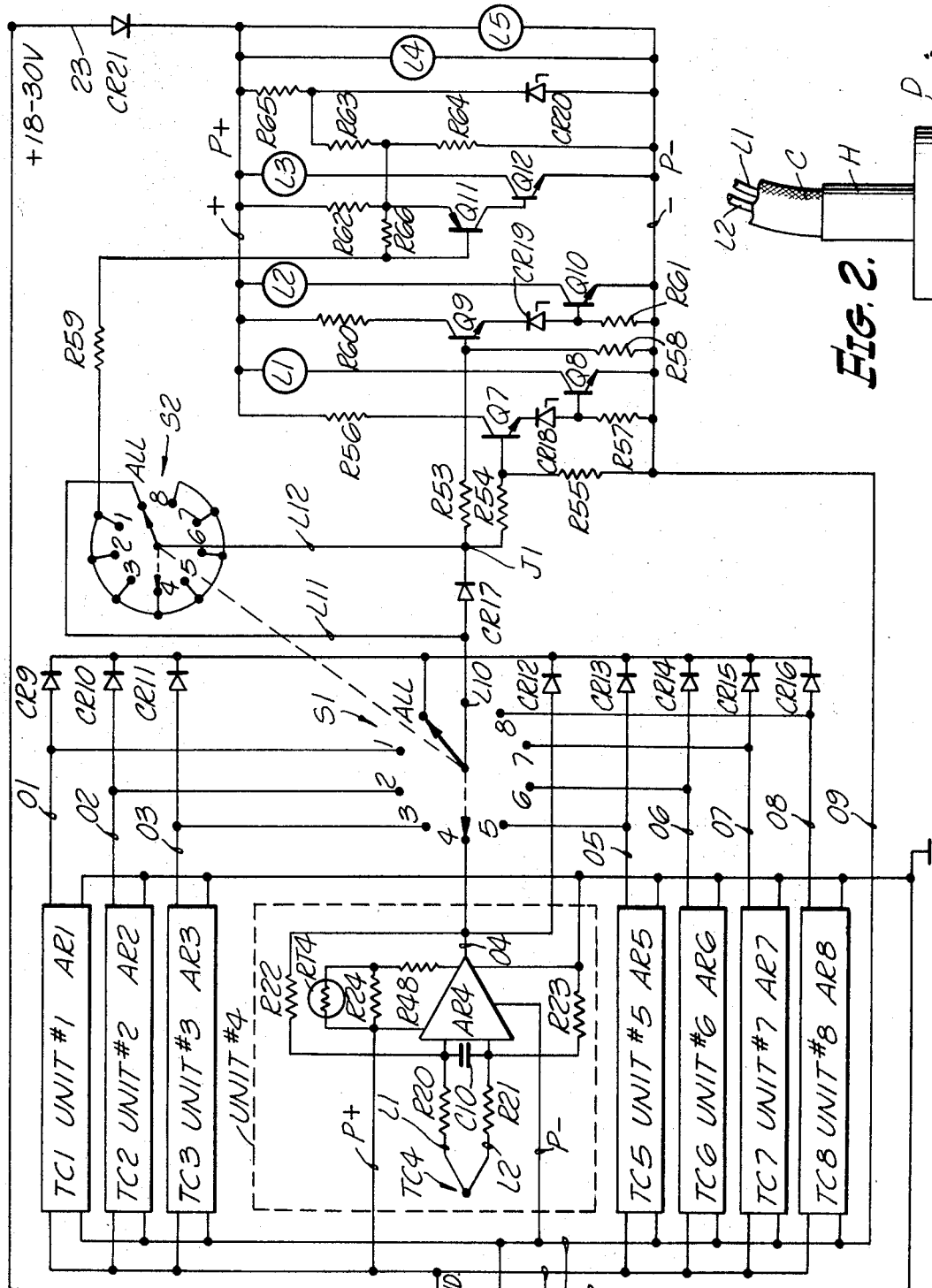

TEMPERATURE INDICATOR FOR AIRCRAFT BRAKES AND THE LIKE

This invention relates to temperature sensing and warning systems and more particularly to a temperature warning system specially suitable for use under the severe operating conditions encountered in the operation of braking systems of aircraft and the like vehicles.

The very great braking demands imposed on aircraft braking systems and particularly larger cargo and passenger craft produce high temperatures which can be and often are hazardous both for the craft and humans present thereon. Not only can abnormal temperature rise lead to malfunctioning and nonfunctioning of the braking system itself but in certain cases can cause tire failure and serious if not fatal damage to the aircraft and loss of life. For example, if the temperature rise at any wheel braking unit reaches 550° F. it is most desirable that the pilot be apprised of this fact in order that he may take prompt corrective action to avoid any substantial further rise. Likewise, and despite the pilot's efforts to avoid further rise, it is most important that the pilot know promptly if the temperature rises to the emergency condition level of 850° F. Under this condition, braking decreases sharply and the high temperature can lead to explosive tire failure and the attending disastrous consequences. Taxiing in preparation for takeoff with a capacity fuel and passenger load imposes a particularly heavy load on the braking system and leads to dangerous temperature rises. If a hot wheel assembly is folded into the aircraft, the lack of cooling air can lead to high-pressure rises in the tire, explosive failure of the tire and destruction of the aircraft.

To guard against the above-mentioned and other related hazards, there have been proposed various expedients for advising the pilot and crew members of dangerous temperature conditions in the supporting wheels, However, such systems as heretofore proposed have been unreliable, inaccurate and incapable of satisfactorily supplying essential information respecting temperature conditions of the braked wheels. The inadequacies of these systems have been due to many factors difficult to provide for in a temperature sensing and warning system. For example, the temperature rises are generated very fast at the interface between the brakeshoe and the brakedrum. If the brakes are applied only briefly, the resulting relatively high instantaneous temperature conditions can be tolerated since a portion of the generated heat is quickly drained into the adjacent wheel structure and other portions are dissipated. However, if braking requirements are severe and prolonged, the very large quantities of heat generated overtax the heat bleeding and dissipating facilities, the tires become heated and their air pressure increases dangerously.

Another aspect of the problem is the fact that larger aircraft have four and as many as eight and more braked wheels. The temperature conditions of the brake for each of these wheels may and customarily does vary widely depending on runway surface conditions, brake adjustment and other variable factors. The temperature at each wheel must be individually sensed and a prompt warning given to the pilot should the temperature at any wheel rise above either of two predetermined values.

One of the more satisfactory of the various attempts heretofore made to resolve these problems utilizes a temperature-sensitive resistor intimately associated with each wheel brake and forming part of an electrical bridge-type warning device. Such a system is capable of providing reliable results in the laboratory or under similar static conditions but it has been found grossly inadequate and unreliable under the severe shock, vibration and the like dynamic operating conditions associated with the operation of aircraft landing gears. Thermocouple-type heat sensors are much more rugged but heretofore there has been no satisfactory and reliable mode of utilizing such sensors to activate a warning system in the pilot's compartment and no satisfactory mode of providing a uniform cold junction temperature reference for the individual thermocouples. Accordingly, no satisfactory system utilizing thermocouple heat sensors has been available for use on aircraft braking equipment.

It is, therefore, a primary object of the present invention to provide a temperature warning system of general application but particularly suitable for use on the braking systems of aircraft and operating to provide the pilot with a positive warning when any braked wheel of the craft reaches a dangerous temperature and also providing at least a second distinctive positive warning to the pilot if the temperature of any wheel reaches a perilous level. This broad objective is achieved, according to one illustrative embodiment of the invention, by locating the hot junction of at least one thermocouple at each braked wheel and extending the cold junction terminals of all thermocouples to associated amplifiers at a common location where all are subject to the same ambient temperature conditions. The outputs of the several amplifiers are connected to a warning device viewable by the pilot and operating to provide a caution signal as soon as any wheel reaches a first selected temperature level, and energizing a second danger signal if any wheel reaches a perilous temperature level.

When either signal occurs, the pilot can operate a simple selector device and quickly determine which one or more of the wheels has reached the undesirable temperature condition. The invention system also includes provision enabling the pilot to check the operativeness of the temperature warning device as part of a routine followed in checking the plane and equipment and instrumentation. All equipment of the invention system can be located compactly land conveniently in the pilot's compartment and merely requires a cable lead to a thermocouple at each braked wheel.

It is, therefore, a primary object of the present invention to provide a highly reliable, rugged temperature sensing and warning system particularly suitable for monitoring temperature conditions at a remote point such as the individual braking components of each braked wheel of an aircraft or similar vehicle and effective to warn a member of the crew when each of different selected temperature levels is reached.

Another object of the invention is the provision of a temperature monitoring and warning system for instantly warning the crew members of an aircraft when the temperature of any braked wheel reaches an undesirable temperature level including means for identifying the wheel or wheels so affected.

Another object of the invention is the provision of a brake temperature monitoring system for the individual braked wheels of a vehicle having at least one thermocouple operatively associated with each brake and provided with the same temperature reference for the cold junctions of all thermocouples and including a plurality of temperature level indicators selectively energizable to indicate whether any wheel has reached an undesirable level as well as which one or more of the wheels is affected.

Another object of the invention is the provision of an improved temperature detecting and warning system for detecting abnormal temperature conditions utilizing a plurality of thermocouple heat sensors connected through cabling to amplifying and readout facilities located remotely from the individual heat sensors and provided with means for compensating for ambient temperature changes at the station for the reference junction facilities.

These and other more specific objects will appear upon reading the following specification and claims and upon considering in connection therewith the attached drawing to which they relate.

Referring now to the drawing in which a preferred embodiment of the invention is illustrated.

FIG. 1 is a schematic of one preferred embodiment of the invention; and

FIG. 2 is a fragmentary view of an individual heat sensor rigidly secured to a nonrotating component of a wheel brake.

Referring first to FIG. 1 of the drawings; electrical energy for the warning system is derived from a suitable source, such as a generator 20, connected to a suitable regulated conventional power supply unit 22. The function of unit 22 is to supply electric power at a constant potential to major components of the warning signal system via positive, negative and ground (GND) leads. It will be understood that the GND lead is connected to the center tap of a transformer secondary winding and to a rectifier and wave-smoothing filter network with the result that the respective plus and minus potentials are substantially equally above and below ground potential. However, power for the signal indicator device preferably is supplied from the 18 to 30 v. DC available at generator 20 and supplied by way of the lead indicated at 23. The exemplary warning system illustrated accommodates eight brakes on a like number of wheels. For each wheel or brake device whose temperature is to be monitored, the system includes a sensor-amplifier unit preferably connected via selected cable means to a thermocouple device located at the respective brake. Since the sensor-amplifier units are operationally alike, a description of one, such as Unit 4, will suffice.

Each of the eight sensor-amplifier units 1 to 8 comprise a respective one of the thermocouple devices TC1, TC2, TC3, TC4, TC5, TC6, TC7 and TC8, and a respective one of amplifier units AR1, AR2, AR3, AR4, AR5, AR6, AR7 and AR8, each connected to receive power from power supply unit 22 via leads P-plus and P-minus.

Thermocouple device TC4, of any suitable type as, for example, an iron-constantan type, is encapsulated in a strong protective housing H (FIG. 2) secured to part D of the brake or other part the temperature of which is to be monitored. It will be understood that the thermocouple junction is in close proximity to or in contact with the part to be monitored in accordance with usual thermocouple installation practice. The thermocouple leads extend through hermetic shielded cabling C to a suitable location for the sensor-amplifier units. The remainder of the system circuitry utilizes conventional circuit conductors, and the indicator means of the system are preferably housed in a protective enclosure or enclosures at an operator's station.

As is indicated in FIG. 1, the hot junction of thermocouple TC4 is connected by leads L1 and L2 to an operational amplifier AR4 by way of resistors R20 and R21. The electrical resistances of leads L1 and L2 have values dependent upon the length and the size of the leads and the value of each varies with the ambient temperature. Resistors R20 and R21 function to minimize the effects of variation in cable resistance for reasons explained more fully below, and a bypass capacitor C10 connected across resistors R20 and R21 bypasses alternating potentials and transients which may appear in the input circuit of the amplifier.

Operational amplifier AR4 has its inverting input terminal connected to lead L1 and its noninverting input terminal connected to lead L2. The amplifier output terminal is shown at 04. A feedback circuit between output 04 and input lead L1 incorporates a resistor R22. The amplifier also includes corrective circuit means comprising resistors R24, R48 and thermistor RT4, effective to change the offset potential to desired values. The noninverting input terminal is also connected to resistor R23 whose function is balancing to ground.

In general, the value of the resistance of the feedback circuit determines the gain of the amplifier. Offset in the amplifier is changed to compensate for the effects of changes in ambient temperature of the thermocouple reference junction, the offset being made to vary linearly with ambient temperature changes by using either positive or negative temperature coefficient resistors in combination with ordinary resistors. For example, if the reference-junction temperature change tends to decrease the amplifier output, the offset is made to change to increase the amplifier output by the same amount so that the net change of amplifier output ideally is zero despite the amplifier input change caused by change of reference-junction temperature. In effecting the temperature change compensation, temperature-sensitive resistor means of proper sign and magnitude of temperature coefficient Tc are used, the sign being dependent upon the polarity of the amplifier offset.

Circuitwise, each of units 1 to 8 is like unit 4, only the ohmic values of some components possibly being different. Resistor R48 of unit 4 is selected to correct the offset of the amplifier, and resistor TR4 is effective to change the offset with ambient temperature variations. If the thermocouple cable resistance is denoted by RC, the gain of amplifier AR4 may be expressed by the equation:

$$\text{Gain} = \frac{R_{22}}{R20 + R_c}$$

The reason for employing an amplifier in units 1 to 8 is to increase the magnitude of the temperature signal voltage produced by the thermocouple to a value sufficient to drive succeeding circuitry in an effective and reliable manner. The amplifier therefore functions to amplify the input signal provided by the thermocouple to usable amplitude. The magnitude of $Rc$ depends upon the length and size of the thermocouple cable. Even among cables of the same size, the resistance varies to some extent and a shall change in $Rc$ can produce a large change in amplifier gain since gain is inversely proportional to $Rc$. Accordingly, resistors R20 and R21 are inserted in series with the cable to minimize or substantially eliminate the effects of change of cable resistance. Since R20 and R21 are much larger than $Rc$, a small change in $Rc$ does not produce any significant change in amplifier gain.

The output lines of the eight numbered units are connected to an OR gate, and also each unit is connected to a respective switch point of portion S1 of a ganged or two-deck selector switch. The OR gate comprises diode rectifiers CR9, CR10, CR11, CR12, CR13, CR14, CR15 and CR16, poled as indicated. With the ganged switches S1 and S2 positioned as shown, the eight signal output lines 01 to 08 of the eight thermocouple-amplifier units are connected via the OR gate diode switch S2 and leads L10, L11 and L12 to the voltage-divider comprising resistors R54 and R55. Accordingly, if the output of any unit is great enough to produce a voltage across resistor R55 equal to the sum of the Zener breakdown potential of the diode CR18 and of the triggering potential of transistor Q7, the latter conducts. Conduction by transistor Q7 provides a voltage drop across resistor R57 adequate to trigger transistor Q8 to conductive state. The current then passing through Q8 energizes lamp L1 indicating to the operator that one of the brake devices D has reached the predetermined lower level alarm temperature. Transistor Q7 is characterized by high beta, whereas transistor Q8 is characterized by low beta and, in consequence, a large current flows through diode CR18 and insures operation of CR18 above the knee of the diode characteristic curve. Diode CR18 performs the dual function of providing a triggering potential to turn on transistor Q7, and of compensating the Q7 and Q8 base-to-emitter potential variation with temperature variation.

The particular brake causing a temperature alarm signal may be identified by rotating switches S1, S2 and noting the numbered position of the switch unit at which the alarm lamp L1 lights, following which these switches are returned to the "ALL" position.

As will be evident following consideration of the preceding description of the thermocouple detector and amplifier units and the first-stage temperature alarm, if the temperature at any brake device reaches a determined higher temperature as, for example, 850° F., the corresponding amplifier output signal is of sufficient intensity to exceed the breakdown potential of Zener diode CR19 and to trigger Q9. Q9 then conducts and triggers transistor Q10 and current flows through high-temperature alarm signal lamp L2. Again, as described previously in connection with the low-temperature first-stage alarm signal, the particular brake responsible for the alarm signal may be identified by the stepping of the ganged switches through all contacts in order and noting the correspondingly numbered position at which the second-stage alarm signal lamp L2 lights.

Other alarm signal circuits similar to that including transistors Q9 and Q10, resistors R53 and R58, and diode CR19 and a lamp such as L2, may be added and arranged to signal when the temperature at any brake reaches other selected temperature levels. In each such circuit the resistor and diode values are selected so that the warning lamp is energized when a brake reaches the determined temperature. The input to each such additional alarm signal circuit is via junction J1, as in the previously explained first-stage and second-stage alarm circuits. The temperatures selected must, of course, be within the operating temperature range of the thermocouple devices used. In the case of the described exemplary iron-constantan thermocouple devices, the upper limiting temperature is approximately 1,400° F. which is above the practical operating limit of vehicle brakes as presently manufactured.

Even though sensor and amplifier failure is unlikely, the invention includes provision for checking these components for failure. For example, the circuitry permits easy detection of open circuit conditions, power loss, and most open and shorted circuit conditions. To that end transistors Q11 and Q12, resistors R62 and R66 and signal lamp L3 are connected as shown with the base of Q11 connected via resistor R59 to the serially connected numbered points 1 through 8 of switch S2. The emitter of Q11 is held at a constant potential by the regulated voltage-dividing circuit comprising resistors R63, R64, R65 and Zener diode CR20, the resistor values being selected to place a positive bias potential of 14 v. above P-minus on the emitter of Q11 from the power supply lead P-plus employed to energize the indicator lamps. It will, therefore, be apparent that if the voltage at the base of Q11 drops to about 13.5 v. or less, Q11 conducts, thereby triggering Q12 into conduction and energizing signal lamp L3. It is evident that for a sufficiently low potential to be applied to the base of Q11 to trigger the same into conduction in a test for an "open" thermocouple or loss of amplifier output, switches S1—S2 must be rotated from the "ALL" position to the numbered positions 1 through 8, in steps. Thus, L3 will remain dark in any of the numbered switch positions unless a thermocouple is open-circuited or an amplifier unit is inoperative. In either of the latter events, the potential applied to the base of transistor Q11 will be less than that required to prevent Q11 from conducting, and conduction through Q11 and Q12 and lighting of signal L3 will ensue.

Representative exemplary circuit components values and data applicable to the illustrated circuit are as follows:

TC1-TC8: Iron constantan

| | | |
|---|---|---|
| R20 1K ohms | RT4 calibration thermister. | CR9-CR17 1N645 |
| R21 1K ohms | | CR18 1N966B |
| R22 200K ohms | Q7 2N930 | CR19 1N967B |
| R23 200K ohms | Q8 2N1613 | CR20 1N966B |
| R24 calibration RN Type. | Q9 2N930 | CR21 1N645 |
| R48 calibration RN Type. | Q10 2N1613 | AR1-AR8 SQ10a |
| R53 calibration RN Type. | Q11 2N3134 | |
| R54 calibration RN Type. | Q12 2N1613 | |
| R55 17.8K ohms | R60 100 ohms | |
| R56 100 ohms | R61 10K ohms | |
| R57 10K ohms | R62 2K ohms | |
| R58 17.8K ohms | R63 Calibration RN type. | |
| R59 100 ohms | R64 15K ohms | |
| | R65 1K ohms | |
| | R66 5.1K ohms | |

In the specific exemplary circuit hereinabove explained and described in detail the cold junctions of the several thermocouples may be maintained at a constant temperature, or compensating means employed in the respective amplifiers which compensate for change of ambient temperature at a location common to all of the cold junctions. However, in certain installations it may be desirable not to depend upon having the several cold junctions at a common temperature, and in such instances the individual circuits are individually compensated for respective variations of ambient temperature at the cold or reference junction of the individual circuit, using at the respective amplifiers resistive networks comprising temperature-sensitive resistive devices of required temperature coefficient polarity and value to effect the necessary compensation.

While the particular temperature indicator for aircraft brakes and the like herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A temperature indicating system adapted to indicate increase in temperature above first and second temperature levels sensed at a plurality of spaced apart temperatures sensor locations, said system comprising: power supply means; a plurality of temperature sensor means including junction thermocouple means arranged to sense temperature at a respective one of said spaced apart locations and each having a sensing junction and a reference junction which reference junctions are located at a common station remote from the respective sensing junctions and subject to the same temperature conditions; operational amplifier means connected to said power supply means and to each of said thermocouple means and having respective feedback circuit means including temperature-sensitive resistive means effective to compensate for changes in ambient temperature at said common station for said reference junctions of said thermocouple means; and first and second potential-sensitive circuit means connected to the output of said amplifier means and to said power supply means and each comprising a respective indicator means and each rendered active incident to sensing of a respective one of said first and second temperatures at said thermocouple means thereby to provide respective indications of attainment of said first and second temperature levels at said thermocouple means.

2. A temperature indicating system as defined in claim 1 characterized in that said operational amplifier means has a pair of signal input terminals bridged by said thermocouple means and operable to amplify potential changes generated by said thermocouple means.

3. A temperature indicating system as defined in claim 2 characterized in the provision of test circuit means for checking said temperature indicating system for operability prior to use including means connecting the test circuit means to said power supply means and to said temperature indicating system, said test circuit means being effective to provide positive indication of a nonfunctioning condition in said temperature indicating system.

4. A temperature indicating system as defined in claim 1 characterized in the provision of a plurality of sets of thermocouple means and associated operational amplifier means connected in parallel between said power supply means and said temperature indicator means, and said temperature indicator means being operable to indicate the attainment of said first and second temperatures by any one of said thermocouple means.

5. A temperature indicating system as defined in claim 4 characterized in the provision of multiple position selector switch means for operably connecting the outputs of each of said operational amplifiers individually to said indicator means and alternatively collectively connecting all of the outputs of said amplifier means to said indicator means via respective diode means.

6. A temperature indicating system as defined in claim 5 characterized in the provision of test circuit means for said temperature indicating system, said test circuit means comprising an amplifier connected to receive constant operating potential bias from said power supply means, said bias being of value less than the normal output potential of either of said operational amplifier means, and means for connecting said amplifier to any of said operational amplifier means to receive the output thereof whereby such output overcomes said constant operating potential bias and biases said amplifier to nonconductive state, and a signal device in said test circuit connected to said amplifier to operate in response to conduction by said amplifier, whereby said signal device is inoperative when connected to any of said operational amplifier means having a normal output potential value and whereby said signal device is operative to furnish a signal when connected to any of said operational amplifier means having an output potential value less than normal.

7. A temperature indicating system as defined in claim 4 characterized in that the operational amplifier means and the feedback circuit means therefor are grouped together at a location remote from all of said thermocouple means, and means at said grouped amplifier means for compensating for changes in ambient temperature.

8. A temperature indicating system adapted for use with the braking components of the individually braked wheels of an aircraft and operable to provide a crew member with notice if the temperature of any braked wheel rises above a selected temperature, said indicating system comprising, in combination with the respective aircraft wheel brake means, thermocouple heat-sensing means located at each braked wheel, means operatively connecting the cold junctions of each thermocouple means with respective operational amplifier means for each heat-sensing means located together at a common point remote from the individual heat-sensing means and including means for compensating for changes in ambient temperature at the cold junction terminals of said thermocouple means, and indicator means responsive to the output signal of any amplifier means in excess of different selected magnitudes each representative of a known temperature level condition at the hot junction of one or more of said heat-sensing means.

9. A temperature indicating system as defined in claim 8 characterized in the provision of selector means operable to connect the output of any individual one of said amplifier means to said indicator means whereby the temperature condition of any braked wheel can be checked at the operator's option.

10. A temperature indicating system as defined in claim 8 characterized in that said thermocouple heat-sensing means is encapsulated in a protective housing with the hot junction thereof in good heat transfer with the brake component the temperature of which is to be monitored.

11. A temperature indicating system as defined in claim 10 characterized in the provision of means interconnecting said amplifier means and said selector means and selectively operable in one position of said selector means to pass an output signal from any amplifier means to said indicator means and operable in other positions thereof to pass the output signal from only a selected one of said amplifier means to said indicator means.

12. A temperature indicating system as defined in claim 11 characterized in that said indicating means includes respective indicator means operable to indicate the attainment of each of a plurality of selected temperature levels.

13. A temperature indicating system as defined in claim 12 characterized in that as many of said indicator means are simultaneously activated as are included within the temperature range up to the highest temperature then being displayed on said indicator means.

14. A temperature indicating system as defined in claim 8 characterized in the provision of separate indicator means responsive to attainment of a different temperature level by said thermocouple heat sensor means.

15. A temperature indicating system as defined in claim 14 characterized in the provision of a respective indicator means for each temperature level to be monitored, and selector means operable in one position to connect all of said amplifier means to each of said indicator means and selectively operable to connect any selected one only of said amplifier means to all of said indicator means.

16. A temperature sensing system adapted to indicate a change in temperature from a particular temperature level of any of a plurality of aircraft wheel brake means, said device comprising: a plurality of sensor means each including thermocouple means having a respective sensing junction arranged to sense a change in temperature and a respective reference junction, all of said reference junctions being at a common location remote from any of said sensing junctions; and a plurality of operational amplifiers each connected to a respective one of said reference junctions and each of said amplifiers having operatively connected thereto a respective temperature-sensitive means effective to compensate for changes in ambient temperature at the respective reference junction of the respective one of said thermocouple means, whereby each of said amplifier means provides an output signal having a value proportional to the potential change produced at the respective sensor means irrespective of ambient temperature change at said common location.

17. A temperature-sensing and alarm system for a vehicle having a number N of independently braked wheels each having a respective brake device, said system being adapted to sense the temperature at each of the brake devices independently and continuously and to provide a first alarm signal incident to sensing a temperature of a first predetermined value at any of said devices and to provide a second alarm signal incident to sensing a temperature of a second predetermined value at any of said devices, said system comprising:
   first means, including N electrical temperature-sensing means, each disposed at a respective brake device to sense the temperature thereat, and electric signal lead means each leading from a respective temperature-sensing means and extending to a common location;
   second means, including at said common location a set of signal amplifier units N in number, each connected to a respective one of said signal lead means to receive signals therefrom, and each having a signal output line;
   third means, including unidirectional electric signal transmitting means, each connected in a respective one of said output signal lines and to a common junction; and
   fourth means, including first and second electrical alarm signal means, each connected to said common junction and each responsive only to a respective output signal level equal to or in excess of a level representative of a respective one of said first and second predetermined temperature values.

18. A temperature-sensing and alarm system according to claim 17, including, switch means having $N+1$ switching contacts, $N$ contacts of which are directly connected to respective ones of said output signal lines, and connections between said switch means and said first and second alarm signal means to permit selection of the output signal on any one of said output signal lines for transmission to said alarm signal means, thereby to permit determination of the individual location of any of said temperature-sensing means which initiates a signal to which said fourth means is responsive.

19. A temperature-sensing and alarm system according to claim 17, in which said amplifier units each comprise operational amplifier means and means compensating said operational amplifier means for changes in the ambient temperature thereat.

20. A temperature-sensing and alarm system according to claim 17, in which each of said temperature-sensing means is a thermocouple means, and in which each of said signal lead means is of electrical resistance greatly in excess of the resistance of the respective thermocouple means, thereby to minimize effects of change of the difference in the ambient temperature at said common location and the ambient temperature at the thermocouple means.

21. A temperature-sensing and alarm system according to claim 17, including means for detecting failure of a signal on either of said output signal lines to attain a value indicative of effective functional operation of the respective amplifier means.